(No Model.)
W. P. YEOMAN.
REVOLVING WINDOW CURTAIN EXHIBITOR.
No. 356,219. Patented Jan. 18, 1887.
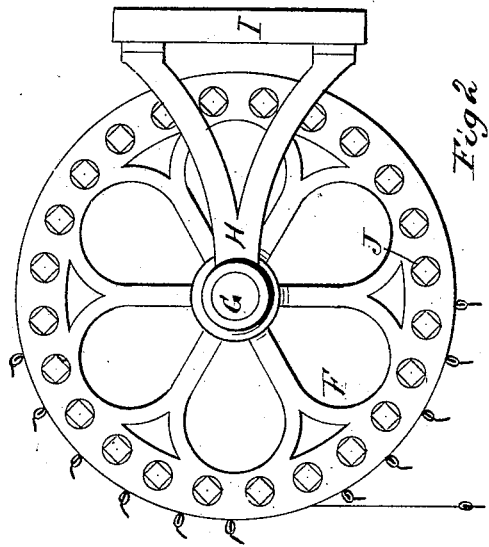
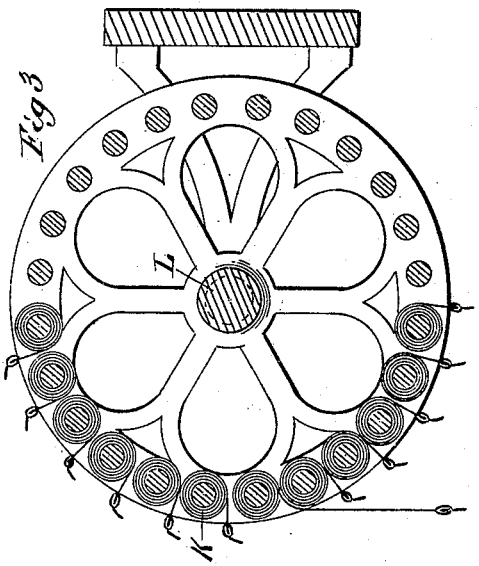
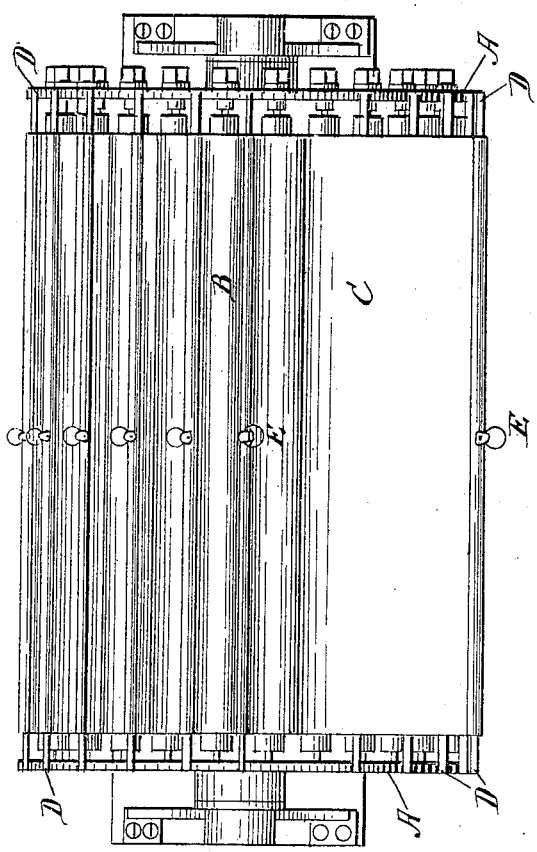
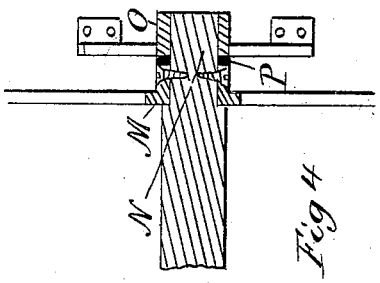
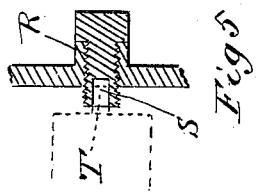
Witnesses
W. C. Coalies
A. H. Thompson
Inventor
William P. Yeoman
By E. C. Crawford,
Attorney

UNITED STATES PATENT OFFICE.

WILLIAM P. YEOMAN, OF WAUKEGAN, ILLINOIS.

REVOLVING WINDOW-CURTAIN EXHIBITOR.

SPECIFICATION forming part of Letters Patent No. 356,219, dated January 18, 1887.

Application filed June 28, 1886. Serial No. 206,442. (No model.)

*To all whom it may concern:*

Be it known that I, WILLIAM P. YEOMAN, a citizen of the United States, residing in the city of Waukegan, in the county of Lake and State of Illinois, have invented a certain new and useful Revolving Window-Curtain Exhibitor, of which the following is a specification.

My invention relates to improvements in contrivances for exhibiting window-curtains to customers by dealers in the same. Its object is to furnish a receptacle for window-curtains, in which they shall be kept rolled up on curtain-rollers, and from which they may be easily unrolled for exhibition.

It consists of two iron wheels fixed parallel to each other and fastened in any of the ordinary ways on a wooden shaft passing through their centers at such distance from each other as the length of the rollers holding the curtains shall determine. One of these wheels is pierced with twenty-four oblong holes near its periphery to receive the ratchet-pin of a spring-fixture in the end of a wooden curtain-roller. The other wheel is pierced with corresponding holes, round, and having threads for screws cut in them. Screws fitting these holes are prepared by having a hole drilled a short distance into the end opposite the head of the screw of such diameter as to permit the insertion and the revolution therein of the journal of a curtain-roller. A curtain-roller provided with a spring-fixture in one end is used, and is fixed in the exhibitor by placing the ratchet-pin of the spring-fixture in one of the oblong holes mentioned above, and the journal of the roller in the drilled hole of a screw passed through a corresponding hole in the opposite wheel. The slats are fastened in the end of the curtain designed to be kept on the outside of the exhibitor, (the other end having been fastened around the roller,) and these slats are made longer than the distance between the wheels, so as not to be drawn through into the exhibitor by the action of the spring in the roller. The shaft on which the wheels are fixed terminates in journals. Over each of these is passed a rubber washer. Iron brackets are made each with an eye to receive a journal of the shaft, and so constructed as to be screwed fast vertically to a board. The journals of the shaft are placed each in the eye of a bracket, and the shoulders of these eyes pressed firmly against the rubber washers, and the brackets are then screwed fast to the board, and this can be fastened to a wall, ceiling, or any convenient support. Thus the exhibitor is ready for use.

The object of the washer is to produce such friction between the hubs of the wheels and the shoulders of the brackets that the wheels of the exhibitor will remain stationary in any position, thus allowing the insertion of heavier curtains on one side of the exhibitor than on another.

The object of the hollow screw is to allow the insertion and removal of some curtains without disturbing others.

The objects of the whole exhibitor are to keep curtains used as samples clean and whole, to make them easily accessible, and to economize in respect to floor room. My exhibitor need occupy no floor room, differing in that respect from all existing exhibitors, and it turns easily in its brackets by applying the hand to it, yet by virtue of the rubber washers loses its motion the moment the hand is withdrawn from it.

I now proceed to describe my invention more particularly, and I refer in such description to the accompanying drawings, in which—

Figure 1 is a front view of the exhibitor when filled with curtains and ready for use; Fig. 2, an end view of the exhibitor; Fig. 3, a vertical section of the exhibitor; Fig. 4, a vertical section of the hub of a wheel, the journal of a shaft, the eye of a bracket, and the rubber washer; Fig. 5, a detail section of the hollow screw in a hole of the wheel prepared for it.

Similar letters refer to similar parts throughout the several views.

In Fig. 1, A represents the wheels of the exhibitor; B, curtains on their rollers, placed in the exhibitor ready for exhibiting; C, a curtain partly drawn out; D, the slats in the ends of the curtains opposite to the rollers; and E, the tags fastened to the slats, to take hold of in drawing out the curtain.

In Fig. 2, F represents the wheel, through which the hollow screws are passed, that receive the journals of the curtain-rollers; G, the end of the shaft on which the wheels are fixed; H, the bracket, in the eye of which the shaft revolves; I, the board to which the brackets are screwed; and J, one of the twenty-four round holes in the wheel, through which the screws pass. (The other wheel of the exhibitor is not represented in the drawings, because it differs from the one represented only in having oblong instead of round holes.)

In Fig. 3, K represents a vertical section of a curtain and its roller and slat in position in the exhibitor; and L, a vertical section of the shaft on which the wheels of the exhibitor are fixed.

In Fig. 4 are represented vertical sections of the hub of a wheel, M, of a journal of the shaft N, of an eye of a bracket, O, and of a rubber washer, P.

In Fig. 5 is seen a detail section of the hollow screw used in the exhibitor, passing through a hole in the wheel prepared for it, R, and within its hollow, S, a journal of a curtain-roller, T.

In this my invention I do not claim the curtain-roller fitted with a spring or any other particular form of curtain-roller as an essential part of my invention. Any kind of curtain-roller may be used that is fitted at one end with an oblong pin to enter the holes in the wheel first above described, and about which pin the roller may revolve, and fitted at the other end with a journal that will revolve in the hollow screws passing through the holes in the wheel secondly above described. I have selected the spring-roller only for the reason that I should select it for use on a window—namely, because it is the most convenient for the end sought.

What I do claim as my invention, and desire to secure by Letters Patent of the United States, is—

The combination of two iron wheels, A A, pierced near their periphery, one with oblong holes, the other with corresponding round holes having screw-threads cut therein to receive, respectively, an oblong pin in one end of a curtain-roller and a hollow screw which receives a journal in the other end of a curtain-roller, the wheels being fixed on a wooden shaft, L L, which revolves in the eyes of brackets H H, screwed to a board, I I, and bearing rubber washers P between the hubs of the wheels and the shoulders of the eyes of brackets, for the purpose specified, all substantially as set forth.

WILLIAM P. YEOMAN.

Witnesses:
F. C. BASSETT,
A. H. THOMPSON.